United States Patent [19]

Phillips

[11] Patent Number: 4,846,136

[45] Date of Patent: Jul. 11, 1989

[54] EXHAUST HEATED INDUCTION AIR FOR TWO-CYCLE ENGINE

[75] Inventor: George E. Phillips, Oshkosh, Wis.

[73] Assignee: Brunswick Corporation, Skokie, Ill.

[21] Appl. No.: 160,583

[22] Filed: Feb. 26, 1988

[51] Int. Cl.[4] .......................................... F02M 31/14
[52] U.S. Cl. .................................................. 123/556
[58] Field of Search ........................................ 123/556

[56] References Cited

U.S. PATENT DOCUMENTS

| | | |
|---|---|---|
| 2,388,331 | 11/1945 | Kincannon . |
| 2,781,032 | 2/1957 | Sebok et al. ................... 123/556 |
| 3,513,817 | 5/1970 | Kearsley ......................... 123/556 |
| 3,800,753 | 4/1974 | Sullivan et al. . |
| 3,805,751 | 4/1974 | Resnick et al. . |
| 3,868,058 | 2/1975 | Hoare ............................. 123/556 |
| 3,918,421 | 11/1975 | Berry et al. ..................... 123/556 |
| 3,974,808 | 8/1976 | Heitert ............................ 123/556 |
| 4,082,068 | 4/1978 | Hale . |
| 4,333,425 | 6/1982 | Kusche . |
| 4,534,333 | 8/1985 | Slattery . |
| 4,545,357 | 10/1985 | Kearsley et al. ................ 123/556 |
| 4,590,897 | 5/1986 | Hundertmark . |

FOREIGN PATENT DOCUMENTS

| | | | |
|---|---|---|---|
| 3043584 | 6/1981 | Fed. Rep. of Germany ...... 123/556 |
| 2146386 | 4/1985 | United Kingdom ............... 123/556 |
| 2155665 | 9/1985 | United Kingdom ............... 123/556 |

Primary Examiner—Willis R. Wolfe
Assistant Examiner—M. Macy
Attorney, Agent, or Firm—Andrus, Sceales, Starke & Sawall

[57] ABSTRACT

Intake air to the carburetor of a two-cycle engine is preheated by ducting ambient temperature outside air past hot engine surfaces. Preferably, a portion of the intake air duct includes a heat exchanger formed integrally with the outer wall of the engine exhaust manifold. The use of heated intake air enhances idle and low speed operation of the engine by reducing or eliminating fuel puddling and by narrowing the temperature range used for carburetor calibration.

15 Claims, 1 Drawing Sheet

EXHAUST HEATED INDUCTION AIR FOR TWO-CYCLE ENGINE

BACKGROUND OF THE INVENTION

The present invention relates to apparatus for improving the low speed and cold weather performance of two-cycle engines and, more particularly, to apparatus which utilizes the engine exhaust to heat induction air to the carburetor to prevent fuel puddling in the crankcase and carburetor icing, and to improve idle speed carburetor calibration.

Two-cycle marine engines, of the type commonly used for outboard motors, utilize the crankcase as part of the fuel supply system. A fuel-air mixture passes through a pressurized crankcase system to the engine combustion chamber. The heavier fractions of the fuel, comprising a gasoline and oil mixture, tend to condense inside the crankcase and collect in low lying areas of the crankcase. This phenomenon is known as "puddling" and causes erratic idle and low speed operation, and when the engine speed is increased, the oil-rich fuel puddles are injected into the combustion chamber resulting in undesirable smoking and misfiring of the engine. Fuel puddling in a two-cycle engine crankcase is aggravated by cool temperatures. The fuel does not mix and vaporize as well in cool or cold air and, therefore, condenses more readily to form puddles at lower temperatures.

Cool humid weather, and the resultant intake of cool air to the carburetor, is also conducive to carburetor icing. Carburetor icing results in poor engine performance and, in severe cases, stalling and temporary complete inoperability of the engine.

The calibration of carburetors for two-cycle engines must typically take into consideration a broad range of possible intake air temperatures from about 20° F. to 100° (−7° C. to 38° C.). As a result, an intermediate compromise carburetor setting is usually made which optimizes performance at an average intermediate temperature, but sacrifices performance at the high and low ends of the range. For example, the carburetor idle speed air-fuel mixture setting often must be manually changed to accommodate the temperature change from a cool morning to a hot afternoon.

In the application of two-cycle engines to marine use, such as in outboard boat motors, emphasis in the past has more typically been on high speed performance, and performance at idle or low speeds has been, to some extent, overlooked or sacrificed. More recently, however, low speed engine performance and operation at idle speeds have drawn attention and attempts have been made to correct or alleviate some of these performance problems.

Various methods and apparatus are known in the prior art to eliminate fuel puddling or the adverse effects thereof. A simple early solution involved draining the puddles from the low lying areas within the crankcase directly to the outside. However, potential environmental concerns have lead to other solutions of the problem. U.S. Pat. Nos. 3,800,753, 805,751, and 4,590,897 describe apparatus for collecting puddled fuel in the crankcase and recycling it within the engine for eventual combustion. U.S. Pat. No. 4,534,333 describes an idle speed air-fuel passage which is heated by directing the passage through the engine exhaust chest or manifold to heat the air-fuel mixture before entry into the crankcase and combustion chamber. A similar system for heating the idle air-fuel mixture is shown in U.S. Pat. No. 2,388,331. U.S. Pat. No. 4,333,425 describes a fuel system in which heat from the exhaust manifold is used to warm a relatively small volume of idle air which is then mixed with fuel and supplied to the engine via an idle fuel-air system separate from the main fuel-air supply system. U.S. Pat. No. 4,082,068 discloses the thermostatic control of engine cooling water to maintain a high engine temperature at idle to help prevent condensation and puddling of fuel in the crankcase.

Automotive applications of four-cycle engines include the use of exhaust manifold heat to help control the temperature of induction air. However, because the fuel systems in two-cycle and four-cycle engines are substantially different in construction and operation, fuel puddling does not occur in the latter.

It has been found that, if the engine is maintained at an operating temperature of approximately 140° F. (60° C.) or higher, fuel puddling problems are significantly reduced because the higher temperature minimizes condensation of the heavier fuel-oil fractions. However, maintaining a higher engine block temperature only indirectly raises the temperature of the engine crankcase. More importantly, however, fuel puddling is not a problem at high engine speed and, in addition, lower engine temperatures result in better and more efficient high speed operation.

The various prior art apparatus for eliminating puddling, identified above, require substantial modifications to the carburetor and other parts of the fuel supply system and are only needed to prevent or alleviate problems occurring during the limited periods of idle or low speed operation. Therefore, it would be desirable to have a simple, yet effective, apparatus for eliminating fuel puddling and carburetor icing, as well as improving the idle speed calibration of carburetors on two-cycle engines.

SUMMARY OF THE INVENTION

In the present invention, heat from the combustion exhaust gases is used to heat induction air prior to intake into the carburetor. The intake air passage is positioned to lie in heat exchanging contact with hot areas of the engine block, preferably the cover of the exhaust chest or the exhaust manifold. Engine heat is transferred to the intake air passage, which preferably includes a heat exchanging apparatus, where ambient temperature incoming air is heated in route to the carburetor.

The intake air passage is also provided with a separate outside air inlet so ambient outside air may be caused to bypass the heat exchanger and passed directly to the carburetor air intake. Thus, heated air may be utilized to eliminate fuel condensation, puddling and carburetor icing, while lower temperature ambient air may be used for high speed operation.

An air inlet closure, such as a hinged door, is positioned in the intake air passage between the heat exchanger and the carburetor to vary and control the temperature of the intake air. The air inlet door or closure may be thermostatically controlled to allow either the heated air or ambient air inlet to be closed or to provide a mixed flow of intermediate temperature air. The air inlet closure may also be controlled mechanically or otherwise to reduce or eliminate higher temperature intake air at higher engine speeds.

A portion of the intake air passage is preferably positioned directly adjacent the exhaust housing and may share a common wall therewith. Heat exchanging surfaces or fins are preferably attached directly to the exhaust housing wall and extend into the intake air passage.

Alternately, intake air may be heated by heat transfer from the engine cooling water, however, the inherently lower temperature of heated cooling water, as compared to combustion exhaust gases, makes the alternative system somewhat less effective.

DETAILED DESCRIPTION OF THE PREFERRED EMBODIMENT

Figure 1:
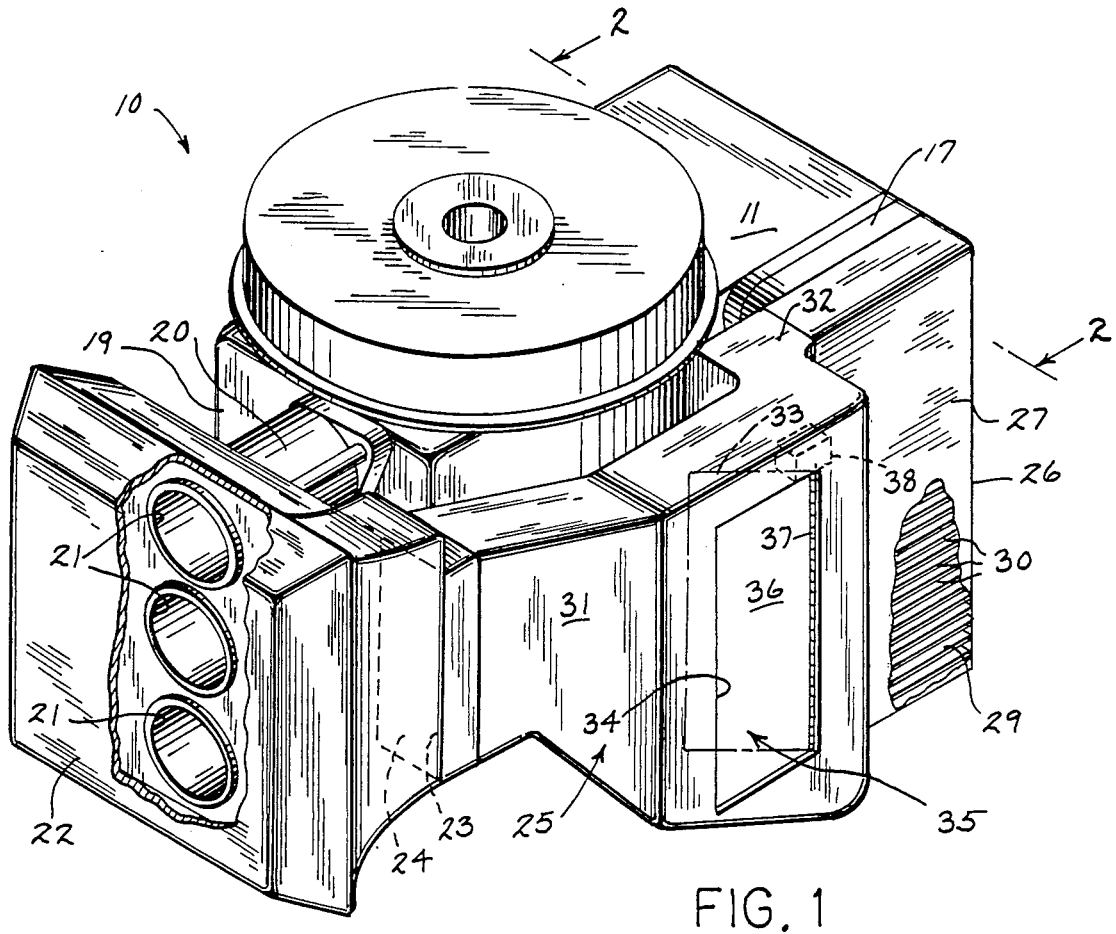
FIG. 1 is a perspective view of a two-cycle engine incorporating the induction air heating apparatus of the present invention.
Figure 2:
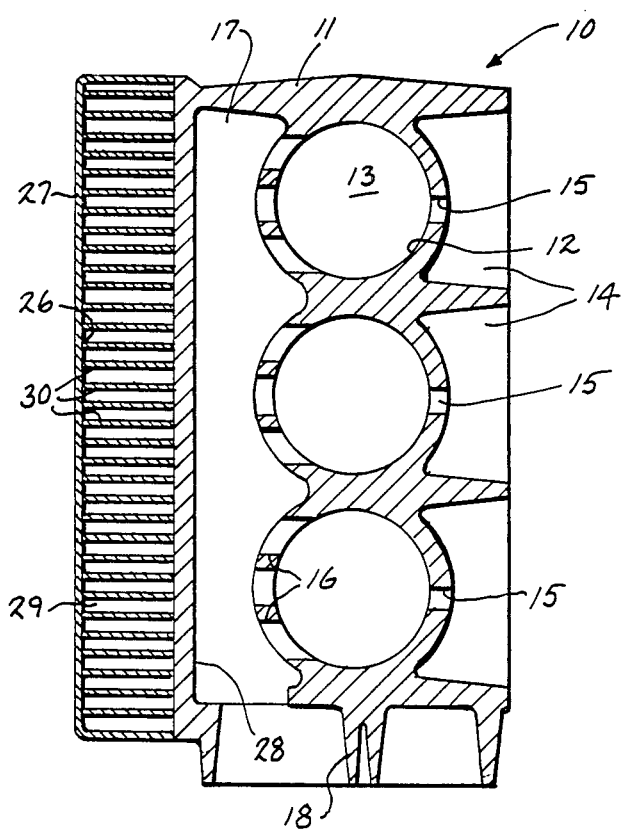
FIG. 2 is a vertical section through the engine block and the portion of the intake air passage incorporating the heat exchanger, taken on line 2—2 of FIG. 1.

In the drawing, a three cylinder two-cycle engine 10 is of a type which may, for example, be used to power a marine outboard motor. The engine 10 comprises a head end 11 including the more or less conventional cylinders 12 which, with the pistons and cylinder head (not shown), form the engine combustion chambers 13. Each combustion chamber 13 is supplied with an air-fuel mixture via a transfer passage 14 and fuel inlet port 15 in the wall of the cylinder 12.

Exhaust gases resulting from combustion of the fuel exit the cylinders via exhaust ports 16 in the cylinder walls and into a common exhaust manifold or housing 17. The exhaust gases exit the engine downwardly through an exhaust outlet 18.

The engine 10 also includes a crankcase 19 which houses the engine crankshaft and, as is typical of two-cycle engines, comprises an integral part of the fuel supply system. A carburetor 20 is attached to the end wall of the crankcase 19 for each of the engine cylinders. Fuel comprising a mixture of gasoline and oil is supplied to each carburetor 20 by conventional means (not shown). Combustion air enters each carburetor through a carburetor intake 21 where it mixes with and atomizes the fuel. The air-fuel mixture from each carburetor 20 passes into the crankcase 19 where it is compressed and directed to a combustion chamber 13 via a transfer passage 14 and inlet port 15.

An air box 22 comprises a common combustion air intake for all three carburetors 20. An induced flow of combustion air is drawn into the air box 22 through an opening 23 which may be covered by a suitable air filter 24.

An intake air passage means 25 is operatively connected to the air box 22 at the opening 23 and houses the apparatus of the present invention. The intake air passage means comprises a substantially open air duct extending along one side of the engine from its connection to the air box 22 to a first outside air inlet 26 at the head end 11 of the engine. The portion of the intake air passage 25 including the first outside air inlet 26 comprises a heat exchanger housing 27 disposed directly adjacent and attached to the exhaust housing 17. Preferably, the outer wall 28 of the exhaust housing 17 comprises the inner wall of the heat exchanger housing 27.

A heat exchanger 29 disposed within the housing 27 includes a series of heat exchanging surfaces or fins 30 of high thermal conductivity. The fins are integrally attached to the outer wall 28 of the exhaust housing 17 and are disposed in vertically spaced parallel relation to provide a substantially open horizontal path for air entering the first outside air inlet 26. An intermediate air passage section 31 extends from the heat exchanger housing outlet 32 to the opening 23 in the air box 22. Within the intermediate air passage section 31 is a warm air inlet 33 in open communication with the outlet 32 from the heat exchanger housing. A second outside air inlet 34 is disposed in the outside wall of the intermediate air passage section 31. Selective opening and closing of the warm air inlet 33 and the second outside air inlet 34 is provided by an air inlet closure 35 common to both inlets 33 and 34. The air inlet closure preferably comprises a door 36 mounted on a vertically disposed hinge 37 in the wall of the air passage section 31. Door 36 may be selectively moved between the position shown with the second outside air inlet 34 fully closed and a position in which the inlet is open and the door completely closes the warm air inlet 33.

In operation, with the second outside air inlet 34 closed as shown, ambient outside air is drawn through the first outside air inlet 26 in the heat exchanger housing. Heat from the outer wall 28 of the exhaust housing 17 is transferred to the heat exchanger fins 30 and is picked up by and warms the ambient air drawn through the heat exchanger. Heated air passes from the heat exchanger 29, into the intermediate air passage section 31, through the warm air inlet 33 therein, through the filter 24, into the air box 22 and the carburetor intakes 21. If the door 36 is pivoted about its hinge 37 to close the warm air inlet 33, ambient outside air will flow directly into the combustion air intake 22 via the open second outside air inlet 34.

Various means may be used to control operation of the air inlet closure door 36. For example, a conventional bimetal thermostatic control 38 (shown schematically) may be used to control the maximum intake air temperature. The control 38 may be used to mix the flows of warm and ambient outside air by establishing an intermediate position for the door 36. Movement of the door 36 to close the warm air inlet 33 may also be effected through the use of other engine controls, such as the throttle, to utilize lower temperature ambient outside air at higher engine speeds.

To test the apparatus for exhaust heating induction air in accordance with the present invention, an outboard motor including an engine modified to incorporate the heat exchanger and heated air supply system described above, was tested. Two tests at ambient air temperatures of 62° F. (17° C.) and 40° F. (4° C.) were conducted by operating the motor in water at temperatures approximately the same as the ambient air. At idle speed and 62° F. ambient air, the heated air temperature in the air box 22 was 96° F. (36° C.). At idle speed and 40° F. ambient air temperature, the heated air in the air box reached a temperature of 83° F. (28° C.).

Although the two tests were run at ambient air temperatures which differed by 22° F., the heated air temperatures differed by only 13° F.. Thus, the intake air temperature range previously used for carburetor calibration can be raised and substantially narrowed, thereby improving overall performance. In addition, intake air heated to the range indicated will decrease substantially or eliminate fuel puddling in the crankcase. Finally, carburetor icing is not known to occur at the higher temperatures of the heated induction air.

Various modes of carrying out the invention are contemplated as being within the scope of the following claims particularly pointing out and distinctly claiming the subject matter which is regarded as the invention.

I claim:

1. In a two-cycle internal combustion engine including an exhaust housing receiving exhaust gases from the engine combustion chamber, an engine crankcase including means for supplying an air-fuel mixture to the combustion chamber, and a combustion air intake in communication with the air-fuel supply means, apparatus for improving engine performance at low speed and/or cool ambient temperatures comprising:
   a. intake air passage means for receiving outside air and directing the same to the combustion air intake;
   b. air heating means in communication with the intake air passage means for heating essentially all of the combustion air supplied to said engine; and
   c. first means for selectively directing ambient outside air through the air heating means at low engine speeds to heat the ambient air to a temperature sufficient to substantially eliminate fuel puddling.

2. The apparatus as set forth in claim 1 including second means for selectively directing ambient outside air directly to the combustion air intake.

3. The apparatus as set forth in claim 2 wherein each of the means for selectively directing ambient outside air includes an air inlet in the intake air passage.

4. The apparatus as set forth in claim 3 including an air inlet closure common to both air inlets and operable to simultaneously effect opening of one inlet and closing of the other.

5. The apparatus as set forth in claim 4, including means for operating the air inlet closure to control the maximum temperature of air to the combustion air intake.

6. The apparatus as set forth in claim 4 wherein operation of the air inlet closure is thermostatically controlled.

7. The apparatus as set forth in claim 4 wherein the air inlet closure is operable in response to engine speed.

8. The apparatus as set forth in claim 1 wherein the air heating means comprises a heat exchanger.

9. The apparatus as set forth in claim 8 wherein the heat exchanger is disposed in the intake air passage means.

10. The apparatus as set forth in claim 9 wherein the portion of the intake air passage means including the heat exchanger is disposed directly adjacent the exhaust housing.

11. The apparatus as set forth in claim 10 wherein the heat exchanger comprises heat exchanging surfaces in the intake air passage, said surfaces being integrally attached to the exhaust housing.

12. The apparatus as set forth in claim 4 wherein the air heating means comprises a heat exchanger.

13. The apparatus as set forth in claim 12 wherein the heat exchanger is disposed in the intake air passage means.

14. The apparatus as set forth in claim 13 wherein the portion of the intake air passage means including the heat exchanger is disposed directly adjacent the exhaust housing.

15. The apparatus as set forth in claim 14 wherein the heat exchanger comprises heat exchanging surfaces in the intake air passage, said surfaces being integrally attached to the exhaust housing.

* * * * *